(12) United States Patent
Ferrazzi

(10) Patent No.: US 7,210,373 B2
(45) Date of Patent: May 1, 2007

(54) CRANKSHAFT FOR A V-TYPE INTERNAL COMBUSTION ENGINE

(75) Inventor: Francesco Ferrazzi, Turin (IT)

(73) Assignee: Fiat Auto S.p.A., Turin (IT)

(*) Notice: Subject to any disclaimer, the term of this patent is extended or adjusted under 35 U.S.C. 154(b) by 245 days.

(21) Appl. No.: 10/515,652

(22) PCT Filed: May 23, 2003

(86) PCT No.: PCT/EP03/05422

§ 371 (c)(1),
(2), (4) Date: Nov. 24, 2004

(87) PCT Pub. No.: WO03/100275

PCT Pub. Date: Dec. 4, 2003

(65) Prior Publication Data

US 2005/0235773 A1 Oct. 27, 2005

(30) Foreign Application Priority Data

May 24, 2002 (IT) .......................... TO2002A0443

(51) Int. Cl.
*F16C 3/04* (2006.01)
(52) U.S. Cl. ............... 74/603; 74/595; 74/596
(58) Field of Classification Search ............. 74/595, 74/597, 603; 418/36; 123/192.1, 599; F02F 7/00; F16F 15/26
See application file for complete search history.

(56) References Cited

U.S. PATENT DOCUMENTS

| 2,817,980 A | 12/1957 | Eberhard |
| 3,978,828 A | 9/1976 | Weber |
| 4,730,512 A | 3/1988 | Ito et al. |
| 4,901,692 A * | 2/1990 | Madden ............... 123/192.2 |
| 4,907,561 A * | 3/1990 | Kandler ............... 123/599 |
| 5,000,141 A | 3/1991 | Sugano |
| 6,371,743 B1 * | 4/2002 | Richards ............... 418/36 |
| 6,912,929 B2 * | 7/2005 | Leith ............... 74/603 |

FOREIGN PATENT DOCUMENTS

| EP | 0 218 037 | * | 4/1987 |
| EP | 0 231 157 | * | 8/1987 |

* cited by examiner

Primary Examiner—Vinh T. Luong
(74) Attorney, Agent, or Firm—Sughrue Mion, PLLC

(57) ABSTRACT

A crankshaft (1) includes a first to a sixth crank pin (41–46), a first to a fourth main journal (21–24) and a first to a ninth crank arm (61–69). At least the first, the second, the eighth and the ninth crank arms (61, 62, 68, 69) have respective integral counterweights (61', 62', 68', 69') for balancing the crankshaft (1). In order to reduce bending stress on the areas where the second and the eighth crank arms (62, 68) are connected to the respective pairs of adjacent crank pins (41–42, 45–46), the axial dimensions of the first and the ninth crank arms (61, 69) are reduced, being substantially the same as those of the adjacent crank arms (62, 68) in order that the axial length of the two end spans of the crankshaft is the same as that of the intermediate span. In order to balance the crankshaft (1), two additional counterweights (71, 72) are arranged outwardly of the end journals (21, 24) and their axial dimensions are comparable to those of the end crank arms (61, 69).

3 Claims, 2 Drawing Sheets

CRANKSHAFT FOR A V-TYPE INTERNAL COMBUSTION ENGINE

Figure 1:
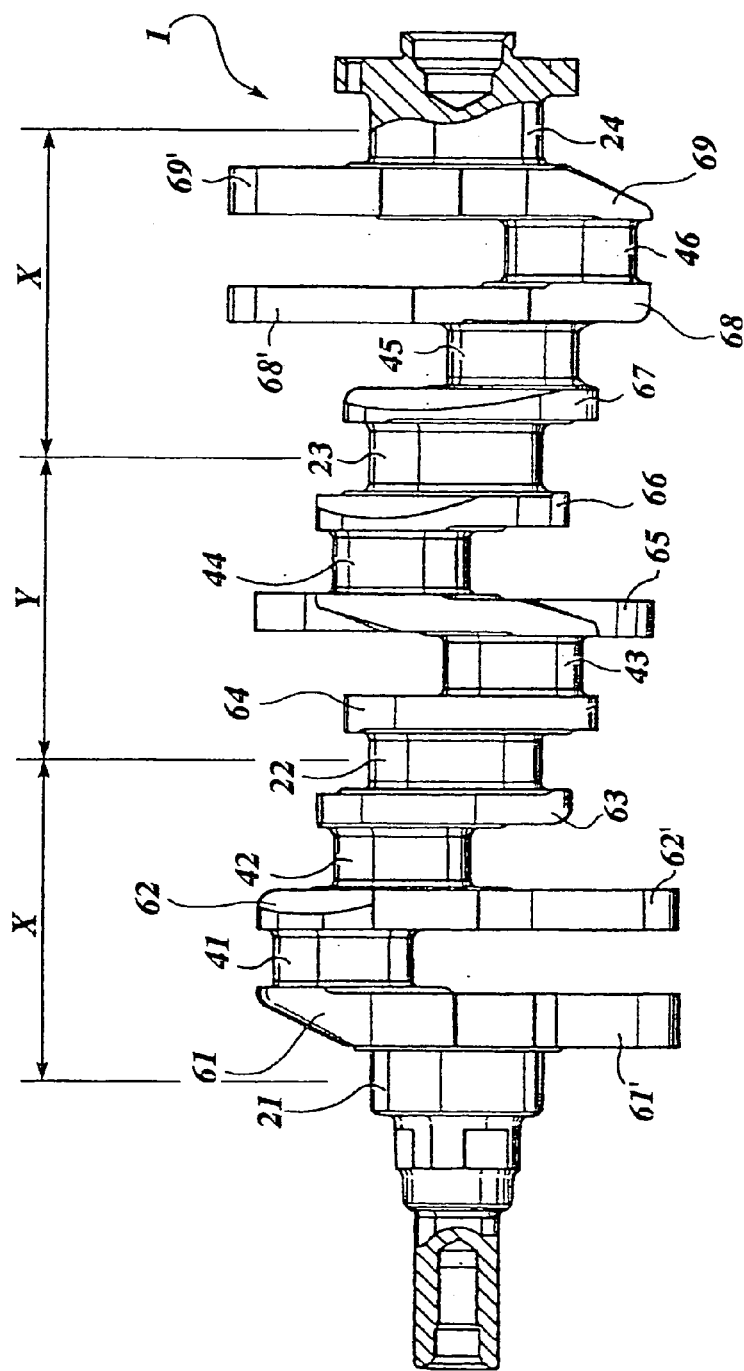

The present invention relates to a crankshaft for a V-type internal combustion engine.

In order better to understand the prior art in this field, and the problems involved therein, a known crankshaft will be described first, with reference to FIG. 1 of the appended drawings, taken from U.S. Pat. No. 4,730,512.

This patent describes a crankshaft, generally indicated 1, for a V-type six-cylinder internal combustion engine. In particular, the crankshaft 1 includes four journals, identified by the numbers 21 to 24 (going from left to right when viewing FIG. 1), and six crank pins, identified by the numbers 41 to 46. The journals and the crank pins are connected by a series of nine crank arms, indicated 61 to 69, of which the first 61, the second 62, the eighth 68 and the ninth 69, are provided with integral counterweights 61', 62', 68' and 69', respectively, for balancing the crankshaft 1.

The main problem with the prior art arrangement described above is that, in order to balance the crankshaft by means of counterweights which are formed integrally with the shaft, the outer crank arms 61 and 69 of each end pair of crank arms 61–62 and 68–69, interposed between the first two journals 21–22 and the last two 23–24, respectively, need to be significantly thicker than the respective inner crank arms 62 or 68. This greater thickness means a significant increase in the length X of the two end spans of the crankshaft, that is, those extending between the pairs of journals 21–22 and 23–24, with respect to the length Y of the central span, which extends between the journals 22 and 23, with a consequent increase in bending stress in the areas where the crank arms 62 and 68 are connected to the adjacent pairs of crank pins 41–42 and 45–46, respectively.

The thickness of these critical areas could, of course, be increased in order to improve stress resistance thereof, but this would result in an additional increase in the overall length of the crankshaft, and therefore of the engine.

In order to balance the crankshaft of a V-type internal combustion engine without having to increase the axial dimension of the end spans, U.S. Pat. No. 5,300,141 provides a crankshaft of the type described above, in which the two pairs of axially outermost crank arms have substantially the same thickness and two further counterweights are arranged outwardly of the axially outermost journals, namely within a pulley and a flywheel, respectively, mounted coaxially with the crankshaft.

This known solution, however, requires the use of a pulley and a flywheel specifically adapted to accommodate each a respective balance weight, which involve a more complicated design of these components and hence a greater cost.

It is therefore the object of the present invention to provide a crankshaft for a V-type internal combustion engine, of the type having a pair of counterweights arranged outwardly of the axially outermost journals, which has a simpler structure and is cheaper to manufacture than the prior art discussed above.

This object is fully achieved according to the invention by a crankshaft having the characteristics defined in claim 1.

Further advantageous characteristics are defined in the dependent claims.

The invention will be described in greater detail hereafter, purely by way of non-limitative example, with reference to the appended drawings, in which:

FIG. 1 is a schematic side elevation view, partially sectioned through an axial plane, of a crankshaft according to the prior art described above; and FIG. 2 is a schematic side elevation view of a crankshaft according to the present invention.

Figure 2:
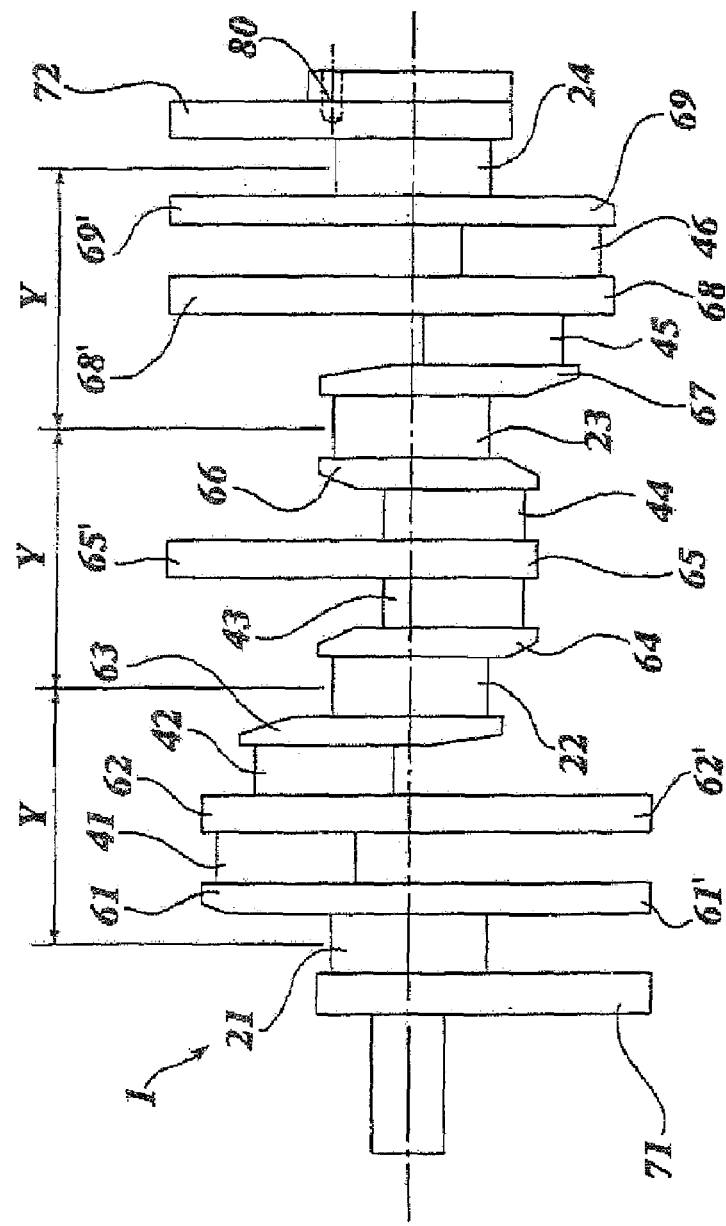

With reference to FIG. 2, where parts and elements identical or equivalent to those of FIG. 1 have been given the same reference numbers, a crankshaft for a V-type six-cylinder internal combustion engine is generally indicated 1 and, from left to right when looking at the drawings, has a first journal 21, a first crank arm 61, a first crank pin 41, a second crank arm 62, a second crank pin 42, a third crank arm 63, a second journal 22, a fourth crank arm 64, a third crank pin 43, a fifth crank arm 65, a fourth crank pin 44, a sixth crank arm 66, a third journal 23, a seventh crank arm 67, a fifth crank pin 45, an eighth crank arm 68, a sixth crank pin 46, a ninth crank arm 69 and, finally, a fourth journal 24.

As in the prior art described above, those elements of the crankshaft that are symmetrical relative to the central element, that is the fifth crank arm 65, form pairs of an equal thickness. In addition, in order to balance the crankshaft, the first crank arm 61, the second 62, the fifth 65, the eighth 68 and the ninth 69 form respective integral counterweights 61', 62', 65', 68' and 69'.

In accordance with the terminology adopted above, in the remainder of the description and in the appended Claims, the term "span" will be used to indicate a portion of crankshaft which lies between two adjacent journals. In addition, the two spans arranged one at each axial end of the shaft will be referred to as "end spans", while the spans interposed axially between the end spans will be referred to as intermediate spans.

In the example illustrated in FIG. 2, the two end spans of the crankshaft 1 are interposed between the pairs of journals 21–22 and 23–24, respectively, while the single intermediate span is interposed between the journals 22 and 23.

According to a first essential characteristic of the invention, in order to avoid any increase in stress in the areas where the crank arms 62 and 68 are connected to the pairs of adjacent crank pins 41–42 and 45–46 respectively, the axial dimensions of the two outermost crank arms 61 and 69 are suitably reduced, making them substantially the same as those of the adjacent crank arms 62 and 68, whereby the two end spans of the shaft are of the same axial length Y as that of the intermediate span.

According to a further essential characteristic of the invention, in order to ensure that the crankshaft 1 is balanced despite the reduction in the axial dimensions of the first and ninth crank arms 61 and 69, the crankshaft includes two additional counterweights 71 and 72 arranged outwardly of the respective end journals 21 and 24. The axial dimensions of the counterweights 71 and 72 are comparable to those of the aforesaid crank arms 61, 62, 68 and 69.

Lastly, according to another aspect of the invention, in order to limit the length of the crankshaft 1, seats BD (schematically illustrated in FIG. 2) for fixing the flywheel (not shown) are formed directly in the counterweight 72 facing towards the flywheel.

The proposed arrangement enables it advantageously to:
distribute the length of the crankshaft evenly along the various spans thereof, ensuring that the shaft is always balanced;
reduce stress on the end spans of the crankshaft, by virtue of the reduction in length of these latter;
limit the length of the crankshaft, by forming the seats for fixing the flywheel directly in the outermost counterweight arranged nearest the said flywheel; and
achieve a reduction in mass, for a crankshaft of the same axial dimensions, compared to prior art arrangements.

Naturally, the principle of the invention remaining unchanged, embodiments and manufacturing details may vary widely compared to those described and illustrated here purely by way of non-limitative example.

In particular, even though the invention has been described with reference to a V-type six-cylinder engine, a man skilled in the art will appreciate that it can be applied equally well to any v-type engine, whatever the number of cylinders.

The invention claimed is:

1. A crankshaft (1) for an internal combustion engine, including;
   a first pair of journals (21, 22) delimiting axially a first end span;
   a second pair of journals (23, 24) delimiting axially a second, opposite end span;
   at least one intermediate span interposed axially between the said first and second end spans;
   a first crank arm (61) connected to the outermost journal (21) of the said first pair of journals (21, 22) and a second crank arm (69) connected to the outermost journal (24) of the said second pair of journals (23, 24), the axial dimensions of the said first and second crank arms (61, 69) being such that the said end spans have substantially the same length (Y) as that of the at least one intermediate span;
   a first and a second counterweight (61', 69') provided on the first and the second crank arm (61, 69), respectively, for balancing the crankshaft (1); and
   a third and a fourth counterweight (71, 72) arranged outwardly of the respective end journals (21, 24); characterised in that seats (80) are formed in one (72) of the said third and fourth counterweights (71, 72) for fixing a flywheel directly to that counterweight.

2. A crankshaft according to claim 1, wherein the said third and fourth counterweights (71, 72) have substantially the same axial dimension.

3. A crankshaft according to claim 2, wherein the axial dimension of the said third and fourth counterweights (71, 72) is substantially the same as that of the first and second crank arms (61, 69).

* * * * *